(12) United States Patent
Swaminathan et al.

(10) Patent No.: US 9,838,743 B2
(45) Date of Patent: Dec. 5, 2017

(54) TECHNIQUES FOR CONTEXT AWARE VIDEO RECOMMENDATION

(71) Applicant: Adobe Systems Incorporated, San Jose, CA (US)

(72) Inventors: Viswanathan Swaminathan, Saratoga, CA (US); Saayan Mitra, San Jose, CA (US); Gang Wu, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2 days.

(21) Appl. No.: 15/052,964

(22) Filed: Feb. 25, 2016

(65) Prior Publication Data

US 2017/0251258 A1 Aug. 31, 2017

(51) Int. Cl.

| H04N 7/16 | (2011.01) |
|---|---|
| H04N 21/466 | (2011.01) |
| G06F 17/30 | (2006.01) |
| H04N 21/45 | (2011.01) |
| H04N 21/2668 | (2011.01) |

(Continued)

(52) U.S. Cl.
CPC ... *H04N 21/4668* (2013.01); *G06F 17/30823* (2013.01); *H04N 21/2668* (2013.01); *H04N 21/4532* (2013.01); *H04N 21/6125* (2013.01); H04N 21/44204 (2013.01); H04N 21/44218 (2013.01); H04N 21/44222 (2013.01); H04N 21/4667 (2013.01)

(58) Field of Classification Search
CPC ........... H04N 21/4668; H04N 21/4667; H04N 21/44204; H04N 21/2668; H04N 21/44218; H04N 21/44222
USPC ............................................... 725/10, 14, 19
See application file for complete search history.

(56) References Cited

U.S. PATENT DOCUMENTS

| 2015/0248618 A1* | 9/2015 | Johnson ............ G06F 17/30761 706/46 |
| 2015/0281783 A1* | 10/2015 | Laksono .......... H04N 21/44222 725/10 |
| 2016/0014461 A1* | 1/2016 | Leech ................ H04N 21/4668 725/14 |

OTHER PUBLICATIONS

Mazumder, Rahul, Trevor Hastie, and Robert Tibshirani, "Spectral Regularization Algorithms for Learning Large incomplete Matrices" Journal of Machine Learning Research, vol. 11, Mar. 1, 2010, 36 pages.

(Continued)

*Primary Examiner* — Pankaj Kumar
*Assistant Examiner* — Franklin Andramuno
(74) *Attorney, Agent, or Firm* — Kilpatrick Townsend & Stockton LLP

(57) ABSTRACT

Systems and methods for identifying, in a network environment in which users watch videos that are downloaded or streamed over a network, a video in which a user is likely to be interested based on session context. For example, a server or other computing system identifies prior session contexts in which prior users watched videos and session progress data for prior sessions in which these prior users watched the videos. The server or other computing system determines a session context of a user for whom a video is to be recommended. For this user, the server or other computing system generates a recommendation identifying one or more videos in which the user is likely to be interested, where the user has not previously watched the recommended videos. The recommendation is generated based on the prior session contexts, the session progress data, and the session context of the user.

20 Claims, 6 Drawing Sheets

(51) Int. Cl.
*H04N 21/61* (2011.01)
*H04N 21/442* (2011.01)

(56) References Cited

OTHER PUBLICATIONS

Rendle, Steffen, et al, "Fast Context-Aware Recommendations With Factorization Machines", Proceedings of the 34th International ACM SIGIR conference on Research and Development in Information Retrieval, ACM, Jul. 2011, 10 pages.

\* cited by examiner

| language | browser | height | width | color | device_id | monthly | new | os |
|---|---|---|---|---|---|---|---|---|
| en-US,en;q=0.5 | 1732888130 | 485 | 320 | 24 | 6953049 | 0 | 1 | 1825753109 |
| en-US,en;q=0.8 | 2387053073 | 0 | 0 | 32 | 4320792 | 1 | 1 | 1110399740 |
| en-US,en;q=0.8 | 2387053073 | 790 | 600 | 32 | 4320792 | 0 | 0 | 1110399740 |

TECHNIQUES FOR CONTEXT AWARE VIDEO RECOMMENDATION

FIELD OF THE INVENTION

This disclosure relates generally to computer-implemented methods and systems and more particularly relates to improving the efficiency and effectiveness of computing systems providing videos to users via electronic communication networks.

BACKGROUND OF INVENTION

Media and entertainment services frequently recommend videos to end users that are selected to appeal to the users' interests. For example, videos are recommended based on predictions of a particular user's interest in particular videos that the user has not previously watched. Providing content that is more relevant to a user's interest can increase the user's viewing experience, and thereby increase the users' engagement with the recommend videos as well as related content, such as advertising content. Providing such recommendations has involved using historical data about how a set of many users has rated or consumed a set of videos. For example, based on recognizing that two users have both rated similar science fiction videos highly, videos that one of the users has not watched and the other user has rated highly can be recommended to the first user. More sophisticated techniques use ratings from many users in a set of users who have watched many of the videos in a large set of videos to provide video recommendations. In addition to using ratings, existing video recommendation techniques have used consumption data such as session progress data (e.g., identifying that a user watched the complete video or only a percentage of the video) to recommend videos that a user is mostly likely to fully consume.

Existing video recommendation techniques use collaborative filtering algorithms to analyze information about ratings or consumption to make video recommendations. For example, such techniques have used a user-by-video matrix with historical ratings for some, but not all, of the user/video points, and used matrix completion or matrix factorization techniques, e.g., singular value decomposition, k nearest neighbors, etc., to complete the matrix with predicted values. Recommendations are based on the predicted values that are determined. For example, for each user, videos that the user has not watched having the highest rating are recommended.

However, existing video recommendation techniques present certain disadvantages. For example, in certain cases, video recommendations may be provided that are not always appropriate or best-suited for a particular user. If a recommendation for a lengthy sports-related documentary is provided to a user while the user is at work at 10 am on a Monday morning, this recommendation ignores the fact that that user never watches documentaries or long programs while at work or between the hours of 8 and 5 on Mondays, and instead has historically watched short news-related video clips while at work between the hours of 8 and 5 on Mondays. In this example, or other cases where a recommendation is ill-suited to a user or the user's context, generating such recommendations utilize computing resources expended on the recommendation without enhancing a user's viewing experience or engagement with video content.

SUMMARY

Embodiments are disclosed herein that identify based on session context a video in which a user is likely to be interested. For example, when a recommendation is sent to a user, the user's session context (e.g., at work, at 10 am, on a mobile device, etc.) is used to identify the video recommendation. To provide such recommendations, user interest in unwatched videos in particular session contexts is estimated using historical information about user interest (e.g., user-provided rating and consumption data). Providing video recommendations based on user's session contexts provides more accurate and appropriate video recommendations than prior video recommendation techniques. These recommendations provide an enhanced viewing experience that is more likely to engage a user in a particular recommended video, as well as related videos such as advertising content that may be presented with a recommended video.

Accordingly, one embodiment of the invention provides a computer-implemented method for identifying a video in which a user is likely to be interested. The method involves receiving historical information regarding videos and users. This information is collected by an analytics service and compiled for use in providing video recommendations. The information identifies session contexts in which users watched videos and identifies measures of user interest (ratings, consumption percentages, etc.) in the videos by the users who previously watched the videos. The information is used to develop a model for estimating user interest in unwatched videos of the videos. When a recommendation is to be provided, the technique identifies a session context of the user and then identifies one or more videos that the user is likely to be interested in based on the model and the session context of the user.

These illustrative features are mentioned not to limit or define the disclosure, but to provide examples to aid understanding thereof. Additional embodiments are discussed in the Detailed Description, and further description is provided there.

DETAILED DESCRIPTION

Figure 1:
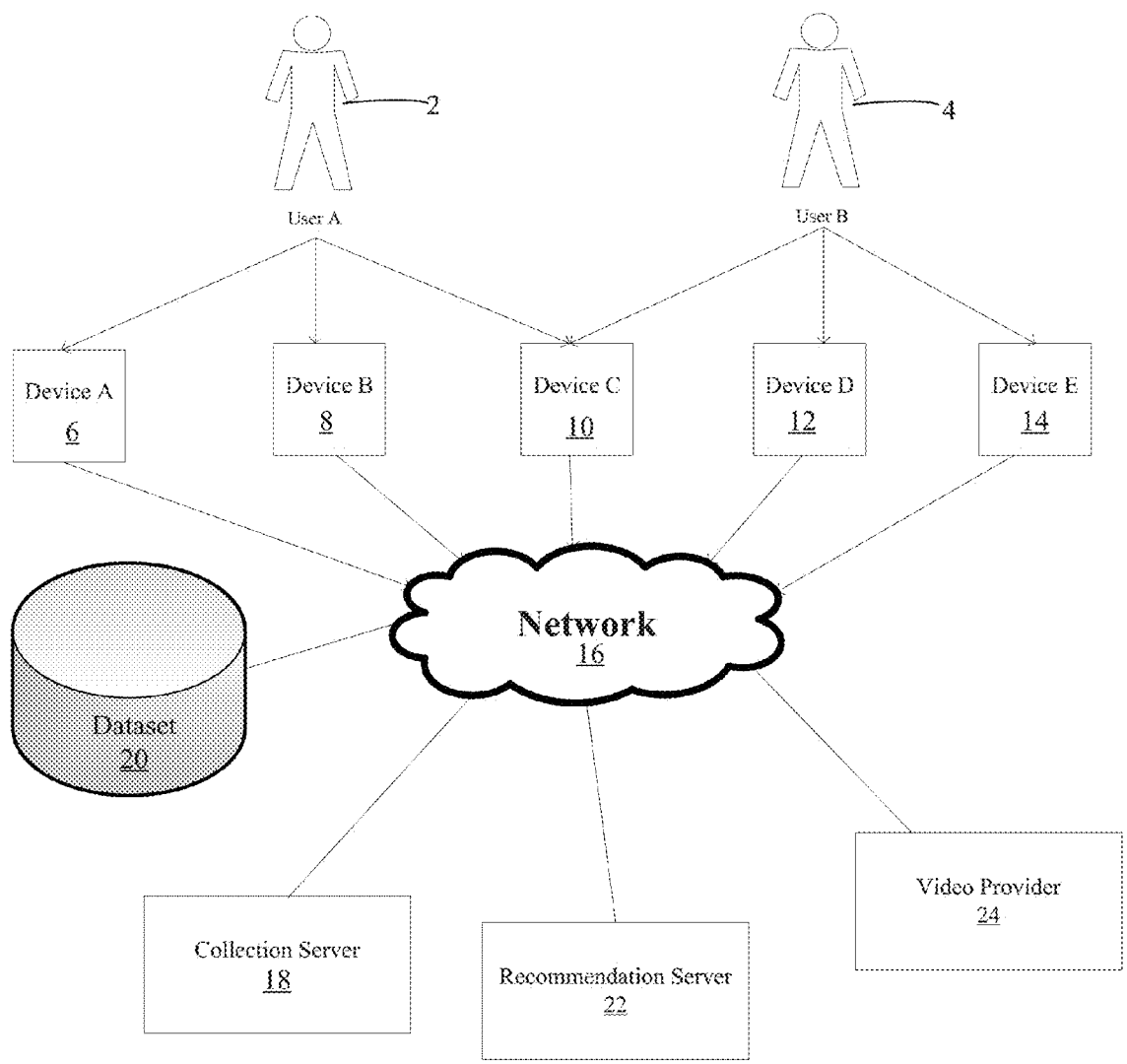
FIG. 1 is a block diagram depicting an example of a system for using session context to identify videos in which a user is likely to be most interested.

Embodiments of the invention disclosed herein provide improved video recommendations by using session context to identify videos in which a user is likely to be most interested. The phrase "user" refers to an individual that uses one or more devices that provide information over a network. The phrase "session context" refers to the circumstances of a user using an electronic device during a period that the user will watch a video. In one example, a session context is a single attribute, for example, identifying that the user is using a mobile device or identifying the user's current time of day. In another example, a session context includes multiple attributes, for example, identifying that the user is using a mobile phone with operating system XYZ and screen size ABC, at an underground subway station, at 8 am on a Monday.

In some embodiments, video recommendations are identified based on historical rating, consumption, and other measures of interest for particular session contexts. For example, a recommendation server or other suitable computing device executes an analytics service and thereby obtains data from a collection server that has collected information related to session contexts. The analytics service compiles or otherwise analyzes the obtained data to generate recommendations for videos that are more likely to be viewed by the relevant users. When these recommendations are provided to computing devices associated with the users, the computing devices use the recommendations to retrieve the recommended videos from one or more video providers.

The phrase "measure of interest" refers to a rating, consumption data, or other statistical or analytical data that specifically, generally, implicitly, or explicitly signifies, represents, or otherwise indicates how interested a user is in a video. A rating (e.g., from 1 to 10) provided by a user after watching a video is an example of a measure of interest. Session progress data (normalized or not) is another measure of interest based on the expectation that the more interested a user is in a given video, the more likely the user will be to watch all or a larger percentage of the video. In one example, historical session progress data identifies that a user viewed 5% of a first video in a first session context, 50% of a second video in a second session context, and 100% of a third video in a third context. The percentage of the videos watched is used as an indication of how interested the user was in the respective videos in the respective contexts. A percentage of time a video application is a focused application during playback of a video is another example of a measure of interest. Amounts of fast-forwarding and/or rewinding during a video also provide measures of interest. A measure of interest can also be a score that combines other measures of interest, for example, a score that combines user-provided ratings and consumption data.

Collecting and using session context-specific measures of interest to provide video recommendations involves compiling historical session context information with measures of interest. For example, a collection system receives a user rating from a user and stores a record indicating the user identity, the video identity, the user rating, the time of use, the geographic location of use, the device type, the operating system, and other information about the session context. The collection system compiles similar information from numerous users for numerous videos and develops a model of user interest in videos from which video recommendations are generated. In this way a model of user interest in videos in specific-session contexts incorporates user features, video features, and session context features.

In some embodiments, the recommendation server uses a feature vector and a factorization machine to account for session context information in the development of video recommendations. The term "factorization machine" refers to a general predictor that uses nested variable interactions and a factorized parameterization, instead of a dense parameterization, for estimating users interests in videos. Unlike prior techniques that used a two-dimensional user-by-video matrix representing rating or consumption data, a recommendation server using a feature vector and a factorization machine framework can jointly analyze session progress information and contextual information. For example, the recommendation server identifies user features, video features, and session features that are indicative of users' interest in videos. Data for these features is provided to the factorization machine model when estimating a user's interest in a video.

The techniques disclosed herein provide numerous benefits over prior video recommendation techniques. Using session context will generally provide a more appropriate recommendation. For example, if a user is at work and someone sends a video to the user, it is very unlikely that the user will watch the video in its entirety. In contrast, late at night, it is much more likely that the user will watch the entire video. Using a combination of device, time of day, who the user is watching the video with, and other session context attributes allows a recommendation engine to provide better predictions of how much of a video the user is going to watch in particular session contexts. In one embodiment, the techniques utilize behavior information to provide additional accuracy. For example, user viewing behavior often differs depending on what the user was viewing previously. Whether a user arrives from a news website or directly accesses a video provider changes the likelihood that the user will watch a particular video. The behavior information allows a recommendation server or other suitable computing device to recognize these context factors (e.g., the user's method of accessing a website) and to identify recommended videos that more closely correspond to the user's likely level of interest.

In additional embodiments, a recommendation server uses a device type associated with session context information to account for the influence of certain device-specific factors on the likelihood of a user viewing a recommended video. As used herein, the term "device" refers to any apparatus that includes electronics, software, and network connectivity to receive and play videos. Examples of devices include, but are not limited to, a desktop computer, a laptop, a tablet, a cell phone, a television, a wearable device such as a watch, a car entertainment system, fitness equipment with video displays, and the like. Using session context information regarding type of device provides particular advantages because device attributes such as screen size and sound capabilities often significantly influence a user's interest in particular videos. For example, one user is most interested in a science fiction action film when using a large screen television home theater system and most interested in a short news-related video when using a small screen, limited volume watch device.

Session context aware video recommendation is intuitively more powerful than just user-based or video-based recommendation. The techniques disclosed herein allow session context and other context information to be combined with the consumption (normalized session progress), ratings, and/or other measures of interest to predict user interest in particular videos in particular contexts. The improved ability to predict user interest in videos is useful for providing video recommendations, load prediction, ad placements, and generally facilitates monetization of video content.

These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

Referring now to the drawings, FIG. 1 is a block diagram depicting an example of a system for using session context to identify videos in which a user is likely to be most interested. User A 2, and user B 4, represent users associated with certain behavior that is tracked. Device A 6, device B 8, device C 10, device D 12, and device E 14, represent devices that are used by user A 2 and user B 4 to access the network 16, such as the internet. In this example, user A 2 accesses the network 16 with device A 6, device B 8, and device C 10; and user B 4 accesses the network 16 with device C 10, device D 12, and device E 14. Both user A 2 and user B 4 access the network 16 with device C 10. It is possible for users to use any number of devices and for each device to be shared by any number of users. The devices 6-14 provide information (e.g., ratings, interactions, and other user behaviors) to collection server 18, which stores user information for a dataset 20 of users. The recommendation server 22 executes an analytics service or other suitable program code and thereby assesses the information from the collection server 18 to provide video recommendations to users such as user A 2 and user B 4. In this example, the videos are provided from video provider 24 over network 16 to the user devices 6-14. For example, the video provider 24 may include one or more servers or other computing devices from which the recommended videos may be retrieved. In some embodiments, a recommendation provided to user devices by a recommendation server includes a link, instructions, or other data or code that is usable by a user device to retrieve recommended videos from a video provider 24.

Figure 2:
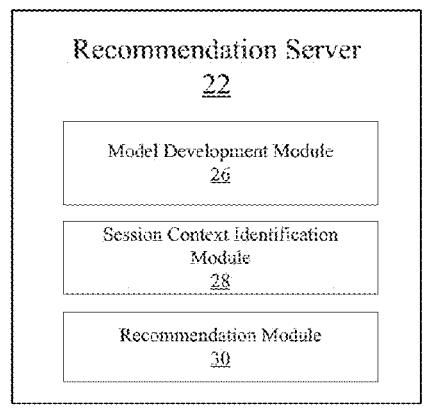
FIG. 2 is a block diagram depicting an example of modules of the server of FIG. 1.

FIG. 2 is a block diagram depicting an example of modules of the recommendation server 22 of FIG. 1. Recommendation server 22 receives information regarding videos and users. The information identifies which users previously watched which videos, session contexts in which users watched videos, and measures of user interest in the videos by the users who previously watched the videos. The model development module 26 of the recommendations server 22 uses this information to develop a model for estimating user interest in videos. For example, if user A 2 (FIG. 1) has not watched a particular video, the model provides a way to estimate how interested the user A 2 will be in the video in differing session contexts.

The recommendation server 22 also includes a session context identification module 28 that identifies a given user's current session context. For example, session context identification module 28 identifies that user B 4 is online using an application through which a recommendation can be provided at 10:22 am of the user's local time, is located at an address that matches the user's home address in a user profile, and is using a device having desktop operating system ABC.

The recommendation server 22 includes a recommendation module 30 that provides a recommendation to a user in a particular context. The recommendation module 30 receives a given user current session context from session context identification module 28 and uses the model to determine one or more appropriate (best) recommended videos for that particular user in that particular current session context. In this way, the recommendation module 30 identifies one or more videos that the user is likely to be interested in based on the model and the current session context of the user.

The recommendation server 22 thus provides context aware digital content consumption prediction. The recommendation module 30 uses the historical content consumption data, ratings data, and/or other information about the interest of many users in many videos to predict individual user's preferences and make relevant recommendations. One embodiment uses a consumption metric, such as session progress, as 'implicit feedback' from the users, using the percentage of the video watched as a substitute or supplement to manual ratings. This is particularly useful in cases where the manual ratings are rare and when user session level consumption metrics are tracked. Adding contextual information, including session contextual information (such as device, OS, browser, geographic location, local time, and so on), to the user feature information (e.g., demographics, user time of data, user location, or other user-specific context) and item feature information (e.g., genre or other video-specific or item-specific context) improves the prediction significantly over prior techniques. The techniques are especially useful for online videos of short form content when there is not enough historical data for each user but rich context information about user sessions is available.

Figure 3:
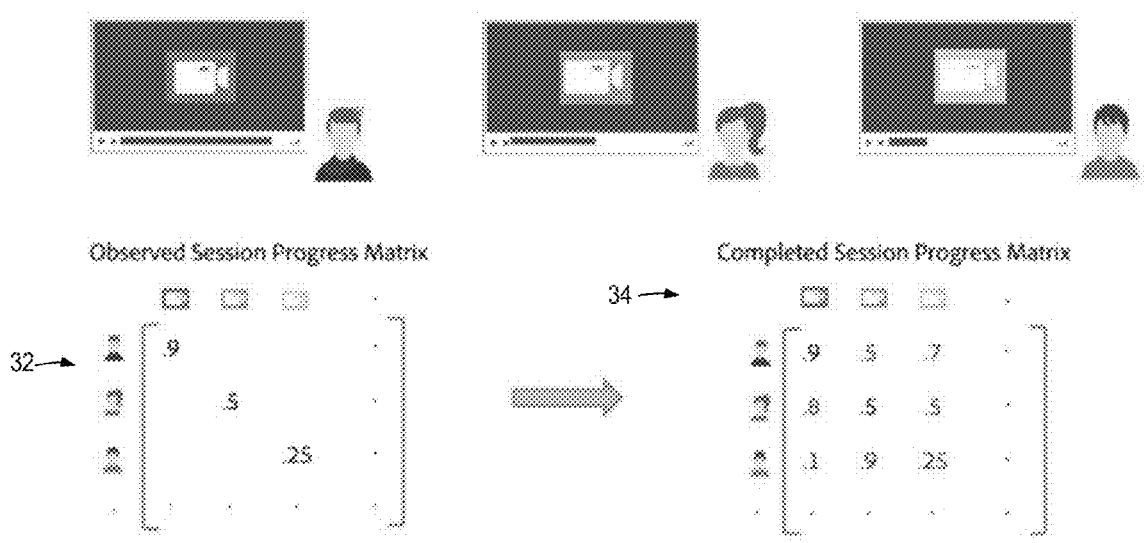
FIG. 3 illustrates completion of a simple, exemplary session progress matrix for three users.

FIG. 3 illustrates completion of a simple, exemplary session progress matrix for three users. FIG. 3 illustrates that three users watched three different videos with three different completions. The first user watched 90% of the first video, the second user watched 50% of the second video, and the third user watched 25% of the third video. These are the observed metrics that are captured by a collection server 18 (FIG. 1). Practical applications will generally involve much more data about many more users watching many more videos. FIG. 3 illustrates an observed session progress matrix 32 that represents the completion values for each of the three users watching each of the three videos. In this example, the first user watching 90% of the first video is represented by the 0.9, the second user watched 50% of the second video is represented by the 0.5, and the third user watched 25% of the third video is represented by the 0.25. In this example, data regarding the three users watching the other respective videos is not available and thus is estimated by completing the matrix using an appropriate technique. Completed session progress matrix 34 shows the results. For first user, the 0.9 was already complete for the first video and values for the other two videos (0.5 for the second video and 0.7 for the third video) are estimated. The 0.5 represents an estimate that the first user will watch 50% of the second video and the 0.7 represents that the first user will watch 70% of the third video. By comparing these values, the recommendation module (FIG. 2) determines to recommend video 3 over video 2 to the first user since the estimation shows that the first user is expected to watch more of the third video than the second and is therefore expected to be more engaged by the third video than the second.

Figures 4, 5:
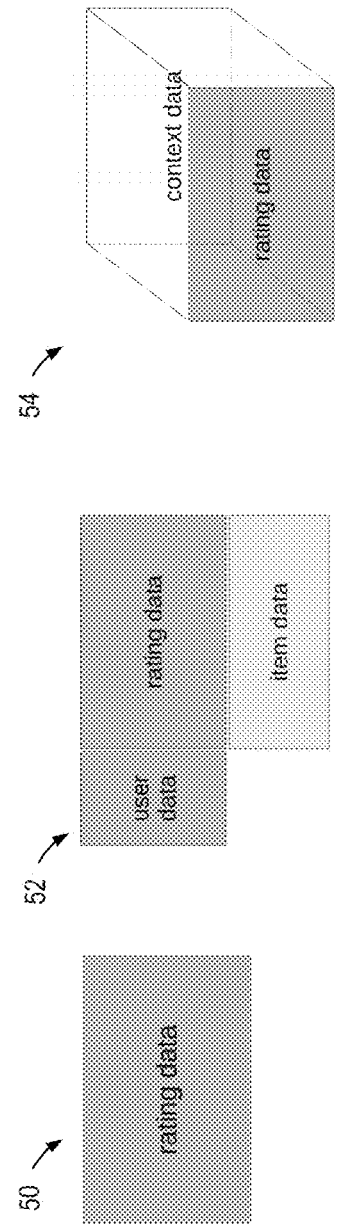
FIG. 4 illustrates a chart of exemplary session context information for three users in particular contexts.
FIG. 5 is a block diagram illustrating how attribute awareness and context-awareness add additional dimensions to information about user interest in videos.

FIG. 4 illustrates a chart 40 of exemplary session context information for three users in particular contexts. The chart 40 illustrates exemplary session context information including, but not limited, to language information ("language"), browser type ("browser"), browser height ("height"), browser width ("width"), color depth ("color"), a mobile device identifier or other device identifier ("device_id"), a flag to identify a monthly visitor ("monthly"), a flag to identify a new visitor ("new"), and operating system ("os"). These exemplary session context information types are provided merely as examples. In many practical implementations, many more types of information about a session context are also collected. Session context variables of particular types can be selected for video recommendation purposes. For example, if 100 different variables are identified, one embodiment of the invention selects a top ten most influential variables for use in the recommendation analysis. In one embodiment, different significances of the session context information variables is accounted for in the model that is developed. For example, weights are included in the model to account for the different significances. Weights of relatively insignificant session context information are set to zero in this embodiment to simplify and improve the efficiency of using the model.

The significance of the session context information variables is not always readily apparent to observers. For example, contrary to what one might expect, operating system data tends to be significant with respect to estimating a user's potential interest in videos. The significance of operating system data may be due, at least in part, to the fact that many mobile devices use different operating systems from many desktop and laptop devices. In this example, the operating system information indirectly represents other relevant features such as device type, screen size, purpose of use, etc. and thus a significant session context information variable. This example shows that in some cases session context information is direct (e.g., such as data on the actual screen size that is a significant feature actually influencing the user) and in other cases session context information is indirect (e.g., such as date on operating system that is indirectly related to the screen size that is the significant feature actually influencing the user).

FIG. 5 is a block diagram illustrating how attribute awareness and context-awareness add additional dimensions to information about user interest in videos. In one example represented by block 50, rating data can be used to generate a recommendation. The ratings data may include data based on one or more user-provided ratings data. In this example, The user interest data (U) for particular video items (I) is used to provide a video recommendation (R):

$$f_1(U,I) \to R$$

For instance, a particular video may be highly rated by all users who have seen the video and may be recommended to another user, who has not seen that particular video, simply based on that high rating. Any suitable function $f_1$ with U and I as inputs can be used to generate the recommendation R. In a non-limiting example, a function that calculates the product of these inputs may be used to generate the recommendation.

In another example represented by block 52, the user interest data (U) for the particular items (I) is used along with user-specific attribute data (Attr(U)) and video-item-specific attribute data (Attr(I)) to provide a video recommendation (R):

$$f_2(U,I,\text{Attr}(U),\text{Attr}(I)) \to R$$

For example, rating information about a particular video, the user's prior high ratings of science fiction videos, and the nature of a video relating to science fiction are used together to provide a video recommendation to the user. Any suitable function $f_2$ with inputs U, I, Attr(U), and Attr(I) can be used to generate the recommendation R. In a non-limiting example, a function that calculates the product of these inputs may be used to generate the recommendation.

In another example represented by block 54, user interest data (U) for the particular items (I) is used along with context data to generate recommendations. In this example, user interest data U, item data I, user specific attribute data $C_3$, video item specific attribute data $C_4$, and other context specific data $C_{5-m}$ are used to provide a video recommendation R:

$$f_3(U,I,C_3,C_4,C_{5-m}) \to R$$

Any suitable function $f_3$ with inputs U, I, and $C_{3-m}$ can be used to generate the recommendation R. In a non-limiting example, a function that calculates the product of these inputs may be used to generate the recommendation.

The context-aware recommendation of block 54 uses multiple context variables for each rating, and the context-specific data includes session specific context data. For example, a given user may rate the same video 5 out of 10 on a mobile device and 8 out of 10 on a home theater device. This interest difference (more interest when watching on home theater than mobile device) in this example is generally consistent across many users in the system. An appropriate prediction model is developed that accounts for these types of differences and makes recommendations accordingly. Because the recommendations account for session-specific and other context information, the quality of the recommendation is often significantly better than recommendations that do not account for that information.

In some embodiments, a combination of session progress information and contextual information is used to generate recommendations. In one example, a feature vector and FM (Factorization Machine) framework is used that can jointly analyze the session progress information and contextual information. This FM framework, as well as any other suitable implementations in which session progress information and contextual information are analyzed in combination, can provide improved recommendation results as compared to using one model for session progress only and a separate model for user ratings only (e.g., a matrix completion model for session progress only and a separate linear model for contextual information only).

Figure 6:
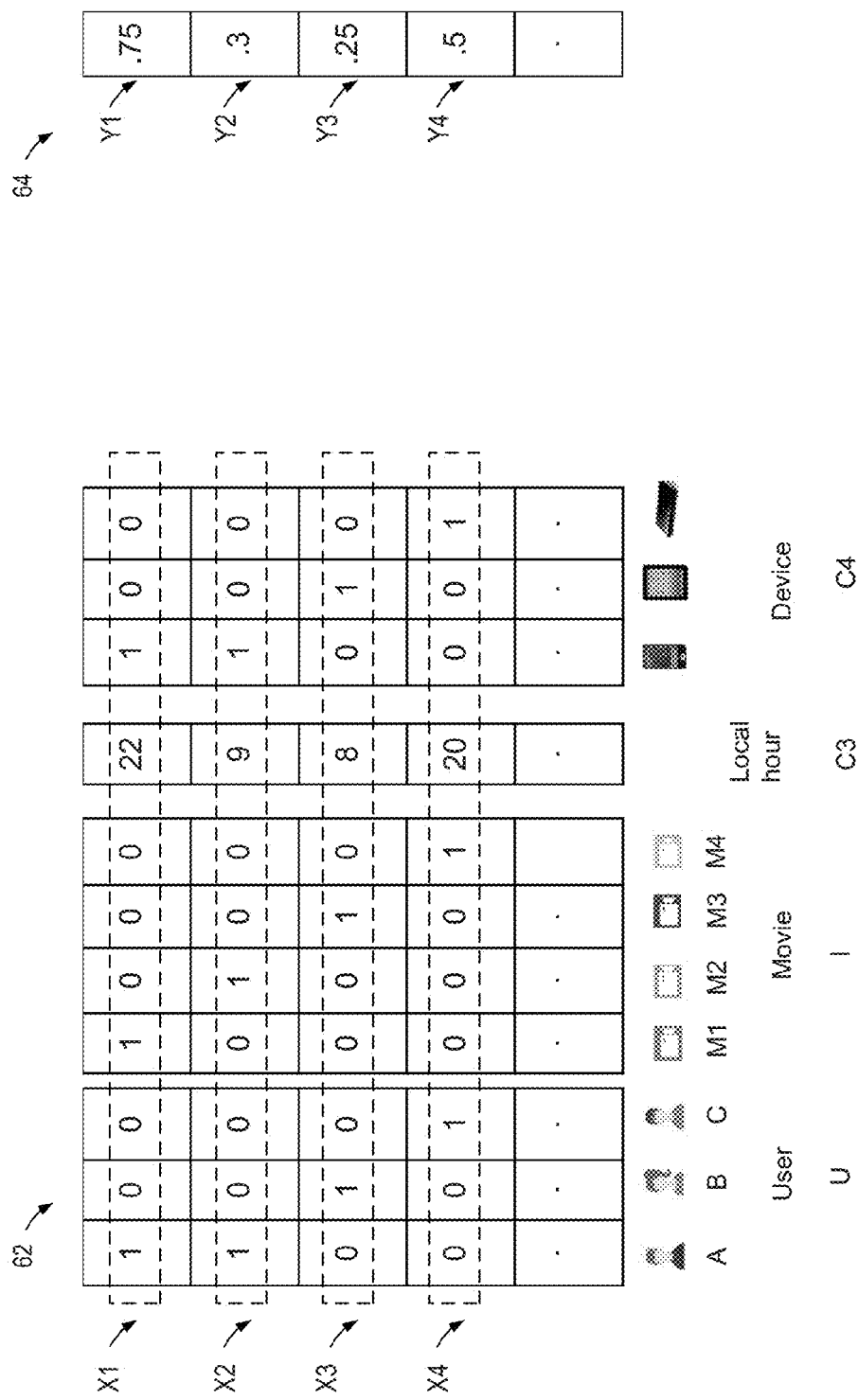
FIG. 6 illustrates use of a feature vector to provide session context specific video recommendations.

FIG. 6 is a chart illustrating an example of using feature vector to provide session context specific video recommendations. The rows of the chart indicate entries of a feature vector 62 and a target vector 64. The feature vector 62 includes attributes (user, video, context parameters such as local hour and device type). The entries of the feature vector 62 account for respective sessions. Thus, if a user watches the same video three times, at three different times, and using different devices (desktop, mobile phone, and television device), each of these three sessions is accounted for in the feature vector, providing three distinct rows.

In this example, recommender data is used to generate a feature vector 62 and target vector 64. Entry X1 of the feature vector 62 shows that user A watched video M1 at local hour 22 (e.g., 11:00 PM local time) on a smart phone device. Similarly, entry X2 of the feature vector 62 shows that user A watched video M2 at local hour 9 (e.g., 9:00 AM local time) on a smart phone device, entry X3 shows that user B watched video M3 at local hour 8 (e.g., 8:00 AM local time) on a tablet device, and so on. Furthermore, recommender data indicating progress of different sessions is used to populate entry Y1 of the target vector 64 that corresponds to entry X1, entry Y2 of the target vector 64 that corresponds to entry X2, and so on.

Unlike prior technique with two-sided matrix with videos and users, this technique uses a feature vector with more than two features. In the example of FIG. 6, the first three features are mutually exclusive. However, a feature vector may also include other features, such as an indicator of another user with whom a video was watched. Such a feature is not mutually exclusive because a user can watch a video with no one, with one person, with two people, etc. This illustrates that the feature vector, in some embodiments, accounts for non-mutually exclusive data and also accounts for data that is gathered via social networking analytics.

In this example, a user-by-video matrix is replaced with a feature vector that cannot be solved using prior matrix-based techniques. In one embodiment, instead of using a matrix completion model and a separate linear model for contextual information, an FM framework is used that can jointly analyze the session progress (or other measure of interest) information and contextual information. A non-limiting example of an FM model is described in Rendle, Steffen, et al. "Fast context-aware recommendations with factorization machines," *SIGIR*, 2011, which is incorporated by reference and which describes the following function for an FM model:

$$\hat{y}(x) = w_0 + \Sigma_{i=1}^n w_i x_i + \Sigma_{i=1}^n \Sigma_{j=i+1}^n \langle v_i, v_j \rangle x_i x_j, \text{ where}$$

$w_0 \in R$, $w \in R^n$, $V \in R^{n \times k}$.

In this example, the variable $\hat{y}$ represents a user rating. The variable $w_i$ represents a weight or bias for features of a feature vector. Specifically, the user feature has a weight, the video feature has a weight, and each context variable has a weight. The variable $w_o$ represents a global bias.

The model in the Rendle example also includes interaction parameters, represented by variables $v_i$ and $v_j$, where the values of variables $v_i$ and $v_j$ result from two of the features being taken at a time. For example, a particular user at a particular time of day having a certain behavior and a particular user and a particular device have certain behavior, etc. Once the weights for the features and interaction parameters are determined, the model can be used to predict a rating, session completion, or other measure of interest for a user, watching a video, with any combination of features. When a recommendation is to be provided to a particular user in a particular session context, a recommendation engine predicts the interest that the user will have in multiple video options in that particular session context using the model and provides a recommendation based on those predictions.

In some embodiments, a general factorization machine framework is customized to account for the feature vector that includes user, item, and context-specific features. Any suitable model may be used to implement the general factorization machine framework. A non-limiting example of a suitable model is provided by the following formula, as described in Rendle, Steffen, et al. "Fast context-aware recommendations with factorization machines," *SIGIR*, 2011, which is incorporated by reference:

$$\hat{y}(x(u, i, c_3, c_4)) = w_0 + w_i + w_u + w_{c_3} + \sum_{t \in c_4} x_t w_t + \langle v_i, v_u \rangle + \langle v_i, v_{c_3} \rangle + \left\langle v_i, \sum_{t \in c_4} x_t v_t \right\rangle + \langle v_u, v_{c_3} \rangle + \left\langle v_u, \sum_{t \in c_4} x_t v_t \right\rangle + \left\langle v_{c_3}, \sum_{t \in c_4} x_t v_t \right\rangle$$

In this Rendle example, the formula uses user, item, and context parameters $c_3$ (e.g., device type) and $c_4$ (e.g., "watched with"). Here again, the variable $\hat{y}$ is a user rating to be computed from the model for a particular video context (e.g., for a particular vector representing a particular combination of user, video, time of day, and who watching with). The variable $w_i$ represents a weight or bias for features of a feature vector. The variable $w_o$ represents a global bias. The contribution of the "watched with" feature (i.e., parameter $c_4$) in computing the target is a summation because it is non-exclusive and can include multiple values (i.e., a user can watch a video with multiple other people in various combinations).

Conceptually, the model provided in this example accounts for various biases. For example, for a given video there is a global average level of interest from people who have already watched the video, e.g., people on average watch the video to 63% completion. However, particular users have biases (e.g., one user on average watches less than 25% of videos that he begins watching). Similarly, bias can come from particular video items, user mood, time of day, geographic location, and other session-specific context information. The model accounts for these biases and interaction biases based on historical data to provide session context-specific video recommendations.

One embodiment of the invention provides automatic feature selection in context aware video analysis and recommendation. Contextual information about the user session significantly improves predictions as compared to other models (e.g., the Rendle examples). The effectiveness and efficiency of the recommendation is improved by automatically selecting significant features. For example, there are usually hundreds of contextual information features tracked for each user session, but only a subset of these features should be used in the prediction. Using only a subset reduces the risk of overfitting with the training data and provides computational efficiency. In some circumstances, determining this subset is not straightforward due to the size of the dataset including millions of users, hundreds of features per session, and redundant information.

In one embodiment of the invention, an appropriate or "best" feature subset is determined using automatic feature selection techniques based on, variance analysis, forwards/backwards selection, or Lasso/Group Lasso, elastic techniques. Some examples of automatic feature selection techniques determine whether two different features are collinear. In these example, an automatic feature selection technique involves omitting one of the features if the different features are found to be highly correlated. For instance, zip codes will be highly correlated with regions because a zip code always belongs to a fixed region. But correlation does not mean causation. Thus, domain expertise may be required to select suitable features.

Figure 7:
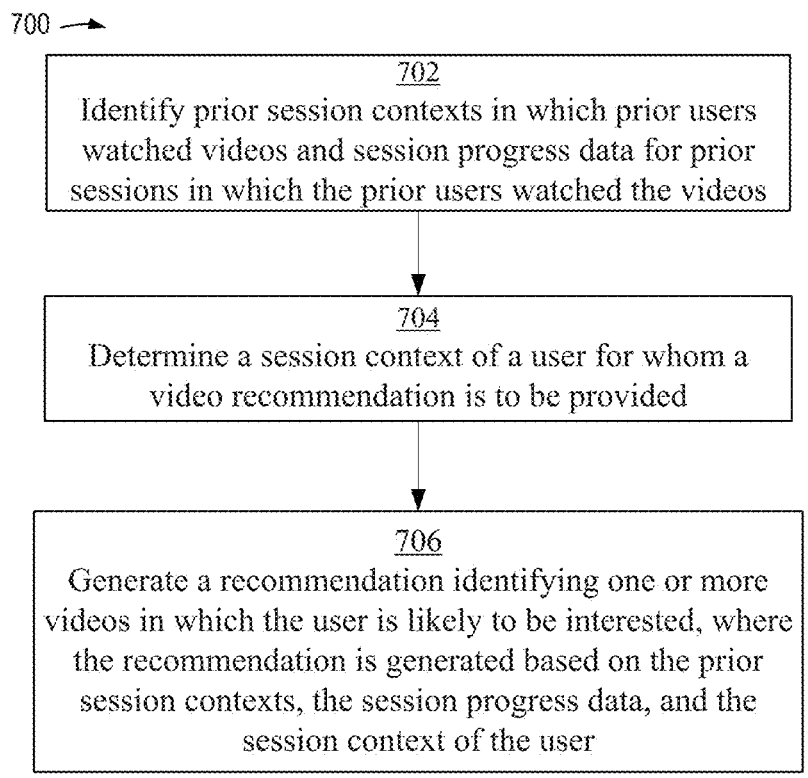
FIG. 7 is a flow chart illustrating another exemplary method for identifying a video in which a user is likely to be interested based on session context.

FIG. 7 is a flow chart illustrating an exemplary method 700 for identifying one or more videos in which a user is likely to be interested based on session context. Method 700 is performed in a computing environment in which video recommendations are provided to users via a network and is specifically performed by a device, such as the server 22 of FIG. 1, comprising a processor executing stored instructions.

Method 700 involves identifying prior session contexts in which prior users watched videos and session progress data for prior sessions in which the prior users watched the videos, as shown in block 702. For example, a recommendation server 22 or other suitable computing device receives information regarding videos and users. At least some of the videos were previously watched by at least some of the users. The information identifies session contexts in which users watched videos and identifies measures of user interest in the videos by the users who previously watched the videos. For example, the information may implicitly identify user interest using session progress data. The session context provides information about a type of device or operating system that the user is currently using, a current time of day of the user, a current geographic location of the user, a referring website, and/or other session context-specific information. The measures of user interest in the videos by the users who previously watched the videos include user ratings provided by user input from the users, consumption data identifying how much of the videos individual users watched, or other analytics data explicitly or implicitly reflecting user interest in video content.

The method 700 further involves determining a session context of a user for whom a video recommendation is to be provided, as shown in block 704. The session context is identified based on analytics data in one embodiment. For example, information about the user's type of device, time of day, etc. can be collected from the user's device. In another embodiment, the user expressly provides session context information. For example, an input screen may query the user's mood, asking whether the user is happy, sad, anxious, etc.

The method 700 further involves generating a recommendation identifying one or more videos in which the user is likely to be interested, where the recommendation is generated based on the prior session contexts, the session progress data, and the session context of the user, as shown in block 706.

For example, a recommendation server 22 or other suitable computing system executes suitable program code for developing a model for estimating user interest in unwatched videos. The model is developed using the information identifying session contexts and the measures of user interest in the videos by the users who previously watched the videos. The developed model is used to generate the recommendation.

In one embodiment, the model uses a factorization machine representation that incorporates user features, video features, and session context features. The recommendation server 22 or other suitable computing system identifies, from the received data describing prior session contexts and the session progress data, various user features, video features, and session features associated with the prior sessions. The recommendation server 22 or other suitable computing system automatically selects a subset of these user features, video features, and session features. For example, this feature subset may be selected based on a relevance of the feature subset to a factorization machine model. The relevance of certain features to the model may be determined using an appropriate or "best" feature subset is determined using automatic feature selection techniques based on, for example, variance analysis, forwards/backwards selection, or Lasso/Group Lasso, elastic techniques, and other suitable techniques, as described above.

These relevant features are included in the factorization machine model. The recommendation server 22 or other suitable computing system then estimates or otherwise models various user interests for various contexts associated with users. For a particular user, the recommendation server 22 or other suitable computing system generates a recommendation based on that user's context matching or otherwise corresponding to one or more contexts for which user interests have been estimated or modeled.

In this way, one or more videos that the user has not watched are identified as likely to be of interest to the user in the particular session context (of more interest than other video options) and provided as video recommendations to the user. Thus, in one example, identifying the video involves predicting measures of interest of the user in multiple videos, recommending a subset of the multiple videos to the user based on the predicted measures, and receiving input from the user selecting the video from amongst the subset of the multiple videos recommended.

Exemplary Computing Environment

Figure 8:
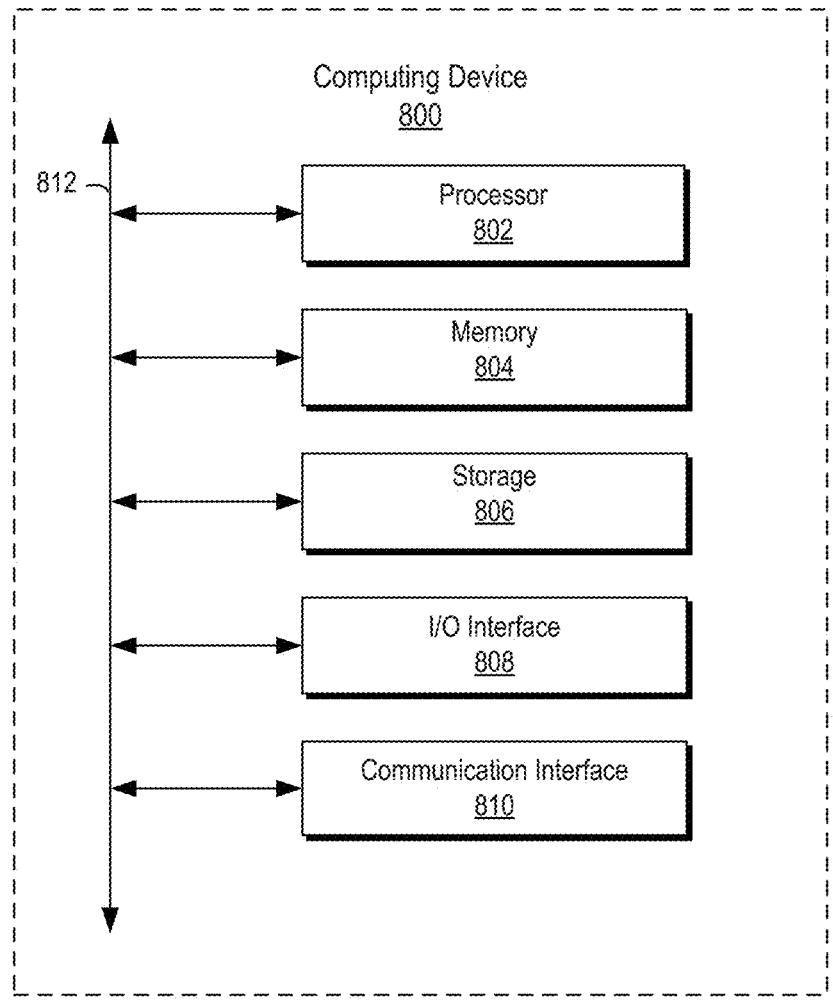
FIG. 8 is a block diagram depicting an example of a computing system used to implement certain embodiments of the invention.

Any suitable computing system or group of computing systems can be used to implement the techniques and methods disclosed herein. For example, FIG. 8 is a block diagram depicting examples of implementations of such components. The computing device 800 can include a processor 802 that is communicatively coupled to a memory 804 and that executes computer-executable program code and/or accesses information stored in memory 804 or storage 806. The processor 802 may comprise a microprocessor, an application-specific integrated circuit ("ASIC"), a state machine, or other processing device. The processor 802 can include one processing device or more than one processing device. Such a processor can include or may be in communication with a computer-readable medium storing instructions that, when executed by the processor 802, cause the processor to perform the operations described herein.

The memory 804 and storage 806 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 800 may also comprise a number of external or internal devices such as input or output devices. For example, the computing device is shown with an input/output ("I/O") interface 808 that can receive input from input devices or provide output to output devices. A communication interface 810 may also be included in the computing device 800 and can include any device or group of devices suitable for establishing a wired or wireless data connection to one or more data networks. Non-limiting examples of the communication interface 810 include an Ethernet network adapter, a modem, and/or the like. The computing device 800 can transmit messages as electronic or optical signals via the communication interface 810. A bus 812 can also be included to communicatively couple one or more components of the computing device 800.

The computing device 800 can execute program code that configures the processor 802 to perform one or more of the operations described above. The program code can include one or more modules. The program code may be resident in the memory 804, storage 806, or any suitable computer-readable medium and may be executed by the processor 802 or any other suitable processor. In some embodiments, modules can be resident in the memory 804. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A computer-implemented method for recommending video content in a network environment in which users watch videos that are downloaded or streamed over a network, the method comprising:
    identifying, by a processing device, prior session contexts in which prior users watched videos and session progress data for prior sessions in which the prior users watched the videos;
    building, by the processing device, an interest-estimation model from the prior session contexts and the session progress data, wherein building the interest-estimation model comprises:
        identifying a feature set comprising (i) user features comprising characteristics specific to the prior users, (ii) video features comprising characteristics specific to the videos, and (iii) session features comprising characteristics specific to the prior sessions,
        determining that a first feature in the feature set is dependent on a second feature in the feature set,
        reducing the feature set for use by a factorization machine model, wherein reducing the feature set comprises selecting a feature subset comprising one or more of the user features, one or more of the video features, and one or more of the session features, wherein the first feature is omitted from the feature subset based on the first feature being dependent on the second feature, and
        estimating, based on a weighted combination of the feature subset provided by the factorization machine model, a set of user interests for videos associated with a set of contexts;
    determining, by the processing device, a session context of a current user;
    generating, by the processing device, a recommendation identifying a video in which the current user is likely to be interested and that has not been previously watched by the current user, wherein the processing device generates the recommendation based on the session context matching one of the set of contexts; and
    causing, by the processing device and based on the recommendation, a content server to transmit the video to a user device associated with the current user.

2. The method of claim 1, wherein generating the recommendation comprises recommending a subset of videos from a set of videos to the current user, and further comprising providing, responsive to a selection input from the current user, the video from the subset of videos recommended.

3. The method of claim 1, wherein the recommendation is also generated based on user ratings included in information describing the prior sessions.

4. The method of claim 1, wherein the session context is a type of device or operating system that the current user is currently using.

5. The method of claim 1, wherein the session context comprises data describing a context of the current user.

6. The method of claim 5, wherein the data describing the context of the current user comprises at least one of:
    a demographic for the current user;
    a current time of day for the current user; or
    a current geographic location of the current user.

7. The method of claim 1, wherein the session context comprises data describing a video context.

8. The method of claim 1, wherein the session context comprises data describing attributes specific to a session.

9. The method of claim 1, wherein the session progress data is generated by the processing device based on consumption data identifying how much of the videos the prior users watched.

10. A system comprising:
    a processing device; and
    a non-transitory computer readable medium communicatively coupled to the processing device,
    wherein the processing device is configured for executing instructions stored on the non-transitory computer-readable medium and thereby performing operations comprising:
        identifying prior session contexts in which prior users watched videos and session progress data for prior sessions in which the prior users watched the videos;

building an interest-estimation model from the prior session contexts and the session progress data, wherein building the interest-estimation model comprises:
    identifying a feature set comprising (i) user features comprising characteristics specific to the prior users, (ii) video features comprising characteristics specific to the videos, and (iii) session features comprising characteristics specific to the prior sessions,
    determining that a first feature in the feature set is dependent on a second feature in the feature set,
    reducing the feature set for use by a factorization machine model, wherein reducing the feature set comprises selecting a feature subset comprising one or more of the user features, one or more of the video features, and one or more of the session features, wherein the first feature is omitted from the feature subset based on the first feature being dependent on the second feature, and
    estimating, based on a weighted combination of the feature subset provided by the factorization machine model, a set of user interests for videos associated with a set of contexts;
determining a session context of a current user;
generating a recommendation identifying a video in which the current user is likely to be interested and that has not been previously watched by the current user, wherein the processing device generates the recommendation based on the session context matching one of the set of contexts; and
causing a content server to transmit the video to a user device associated with the current user.

11. The system of claim 10, wherein generating the recommendation comprises recommending a subset of videos from a set of videos to the current user, and further comprising providing, responsive to a selection input from the current user, the video from the subset of videos recommended.

12. The system of claim 10, wherein the processing device is further configured for generating the recommendation based on user ratings included in information describing the prior sessions.

13. The system of claim 10, wherein the session context is a type of device or operating system that the current user is currently using.

14. The system of claim 10, wherein the session context comprises data describing at least one of:
a demographic for the current user;
a current time of day for the current user; or
a current geographic location of the current user.

15. The system of claim 10, wherein the session context comprises data describing a video context.

16. The system of claim 10, wherein the session context comprises data describing attributes specific to a session.

17. A non-transitory computer readable medium storing program code executable by a processing device, wherein the program code comprises:

program code for identifying prior session contexts in which prior users watched videos and session progress data for prior sessions in which the prior users watched the videos;
program code for building an interest-estimation model from the prior session contexts and the session progress data, wherein building the interest-estimation model comprises:
    identifying a feature set comprising (i) user features comprising characteristics specific to the prior users, (ii) video features comprising characteristics specific to the videos, and (iii) session features comprising characteristics specific to the prior sessions,
    determining that a first feature in the feature set is dependent on a second feature in the feature set,
    reducing the feature set for use by a factorization machine model, wherein reducing the feature set comprises selecting a feature subset comprising one or more of the user features, one or more of the video features, and one or more of the session features, wherein the first feature is omitted from the feature subset based on the first feature being dependent on the second feature, and
    estimating, based on a weighted combination of the feature subset provided by the factorization machine model, a set of user interests for videos associated with a set of contexts;
determining a session context of a current user;
program code for generating a recommendation identifying a video in which the current user is likely to be interested and that has not been previously watched by the current user, wherein the processing device generates the recommendation based on the session context matching one of the set of contexts; and
program code for causing, based on the recommendation, a content server to transmit the video to a user device associated with the current user.

18. The method of claim 1, wherein the processing device selects the feature subset by applying, to the feature subset, one or more of a variance analysis process, a forwards/backwards selection process, and a lasso-based regression analysis process.

19. The method of claim 18, wherein the one or more of the variance analysis process, the forwards/backwards selection process, and the lasso-based regression analysis process computes a correlation between first data values for the first feature and second data values for the second feature,
wherein processing device determines that the first feature is dependent on the second feature based on the computed correlation exceeding a threshold correlation.

20. The method of claim 1, wherein the session context comprises data describing a combination of a demographic for the current user, a current time of day for the current user, and a current geographic location of the current user.

* * * * *